(12) United States Patent
Liu et al.

(10) Patent No.: US 8,910,219 B2
(45) Date of Patent: *Dec. 9, 2014

(54) SYSTEM AND METHOD OF DELIVERING VIDEO CONTENT

(75) Inventors: Kuo-Hui Liu, San Ramon, CA (US); Yongdong Zhao, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/477,163

(22) Filed: May 22, 2012

(65) Prior Publication Data

US 2012/0233650 A1 Sep. 13, 2012

Related U.S. Application Data

(63) Continuation of application No. 11/848,818, filed on Aug. 31, 2007, now Pat. No. 8,209,728.

(51) Int. Cl.
*H04N 7/173* (2011.01)
*H04N 21/436* (2011.01)
*H04L 29/06* (2006.01)
*H04N 21/6373* (2011.01)

(52) U.S. Cl.
CPC ...... *H04L 65/4092* (2013.01); *H04N 21/43615* (2013.01); *H04L 65/4076* (2013.01); *H04L 65/80* (2013.01); *H04N 21/6373* (2013.01)
USPC ............................................. 725/86; 725/100

(58) Field of Classification Search
CPC ................. H04L 65/4076; H04N 21/6373
See application file for complete search history.

(56) References Cited

U.S. PATENT DOCUMENTS

| | | | |
|---|---|---|---|
| 6,049,823 | A | 4/2000 | Hwang |
| 6,166,730 | A | 12/2000 | Goode et al. |
| 7,430,222 | B2 | 9/2008 | Green et al. |
| 7,444,419 | B2 | 10/2008 | Green |
| 7,477,653 | B2 | 1/2009 | Smith et al. |
| 7,761,902 | B2 | 7/2010 | Liu et al. |
| 7,873,699 | B2 | 1/2011 | Ha et al. |
| 7,881,695 | B2 | 2/2011 | Iwamura |
| 7,934,231 | B2 | 4/2011 | Liu et al. |
| 8,209,728 | B2 | 6/2012 | Liu et al. |
| 2002/0124258 | A1 | 9/2002 | Fritsch |
| 2003/0093814 | A1 | 5/2003 | Birmingham |

(Continued)

OTHER PUBLICATIONS

Non-Final Office Action for U.S. Appl. No. 11/848,818 mailed May 26, 2010, 11 pages.

(Continued)

*Primary Examiner* — Rong Le
(74) *Attorney, Agent, or Firm* — Toler Law Group, PC

(57) ABSTRACT

A method includes receiving at a set-top box device first video content associated with a requested channel from a first source. The method includes, in response to receiving the first content, requesting second video content associated with the requested channel from a second source. The method includes, in response to receiving the second video content, determining whether at least one data packet associated with the requested channel was not received based on a comparison of first data packets corresponding to the first video content and second data packets corresponding to the second video content. In response to a determination that at least one data packet was not received, sending a retry request to the first source. The retry request includes an overhead bandwidth factor.

19 Claims, 10 Drawing Sheets

(56) References Cited

U.S. PATENT DOCUMENTS

| | | | |
|---|---|---|---|
| 2004/0034863 A1 | 2/2004 | Barrett et al. | |
| 2004/0034864 A1 | 2/2004 | Barrett et al. | |
| 2004/0261094 A1 | 12/2004 | Huslak et al. | |
| 2005/0071882 A1 | 3/2005 | Rodriguez et al. | |
| 2005/0081244 A1 | 4/2005 | Barrett et al. | |
| 2005/0144248 A1 | 6/2005 | Doganowski et al. | |
| 2005/0183120 A1 | 8/2005 | Jain et al. | |
| 2005/0216948 A1 | 9/2005 | MacInnis | |
| 2006/0041912 A1 | 2/2006 | Kuhns | |
| 2006/0126667 A1 | 6/2006 | Smith et al. | |
| 2006/0218239 A1 | 9/2006 | Umezawa et al. | |
| 2006/0288391 A1* | 12/2006 | Puthiyedath | 725/89 |
| 2007/0016688 A1 | 1/2007 | Hester et al. | |
| 2007/0107023 A1* | 5/2007 | Versteeg et al. | 725/95 |
| 2007/0174883 A1 | 7/2007 | McEnroe et al. | |
| 2007/0192812 A1* | 8/2007 | Pickens et al. | 725/94 |
| 2007/0204312 A1 | 8/2007 | Wheelock | |
| 2008/0141309 A1* | 6/2008 | Barsness | 725/58 |
| 2008/0282127 A1* | 11/2008 | Mantha et al. | 714/751 |
| 2008/0282301 A1 | 11/2008 | Liu et al. | |
| 2008/0310436 A1 | 12/2008 | Bareis | |
| 2009/0044226 A1 | 2/2009 | Ellis et al. | |
| 2009/0060028 A1 | 3/2009 | Liu et al. | |
| 2009/0219992 A1* | 9/2009 | Wang | 375/240.03 |
| 2009/0235319 A1 | 9/2009 | Mao et al. | |
| 2010/0172645 A1 | 7/2010 | Liu et al. | |
| 2010/0238953 A1 | 9/2010 | Liu et al. | |

OTHER PUBLICATIONS

Non-Final Office Action for U.S. Appl. No. 11/848,818 mailed Oct. 14, 2010, 19 pages.

Final Office Action for U.S. Appl. No. 11/848,818 mailed Feb. 17, 2011, 8 pages.

Non-Final Office Action for U.S. Appl. No. 11/848,818 mailed Jun. 2, 2011, 28 pages.

Notice of Allowance for U.S. Appl. No. 11/848,818 mailed Feb. 22, 2012, 36 pages.

* cited by examiner

SYSTEM AND METHOD OF DELIVERING VIDEO CONTENT

CROSS-REFERENCE TO RELATED APPLICATIONS

The present application claims priority from and is a continuation application of U.S. patent application Ser. No. 11/848,818, filed Aug. 31, 2007 and entitled "SYSTEM AND METHOD OF DELIVERING VIDEO CONTENT," the content of which is expressly incorporated herein by reference in its entirety.

FIELD OF THE DISCLOSURE

The present disclosure is generally related to delivering video content.

BACKGROUND

Using an IP network to provide video services in addition to voice and data services can present quality of service challenges. For instance, the bandwidth allotted to a single household communicating with an IP network can be limited by loop length, loop condition, or other physical layer constraints. If the overall IP traffic streamed to the household exceeds the allotted bandwidth, other traffic may be dropped, causing other households to experience service degradation. This can be particularly true with respect to video traffic, the quality of which can be especially sensitive to packet loss. Nonetheless, certain events, such as channel change and lost packet recovery may require additional bandwidth to meet quality of service standards for video traffic, while still avoiding bandwidth overflow. Accordingly, there is a need for an improved system and method of delivering video content.

DETAILED DESCRIPTION OF THE DRAWINGS

Figure 1A:
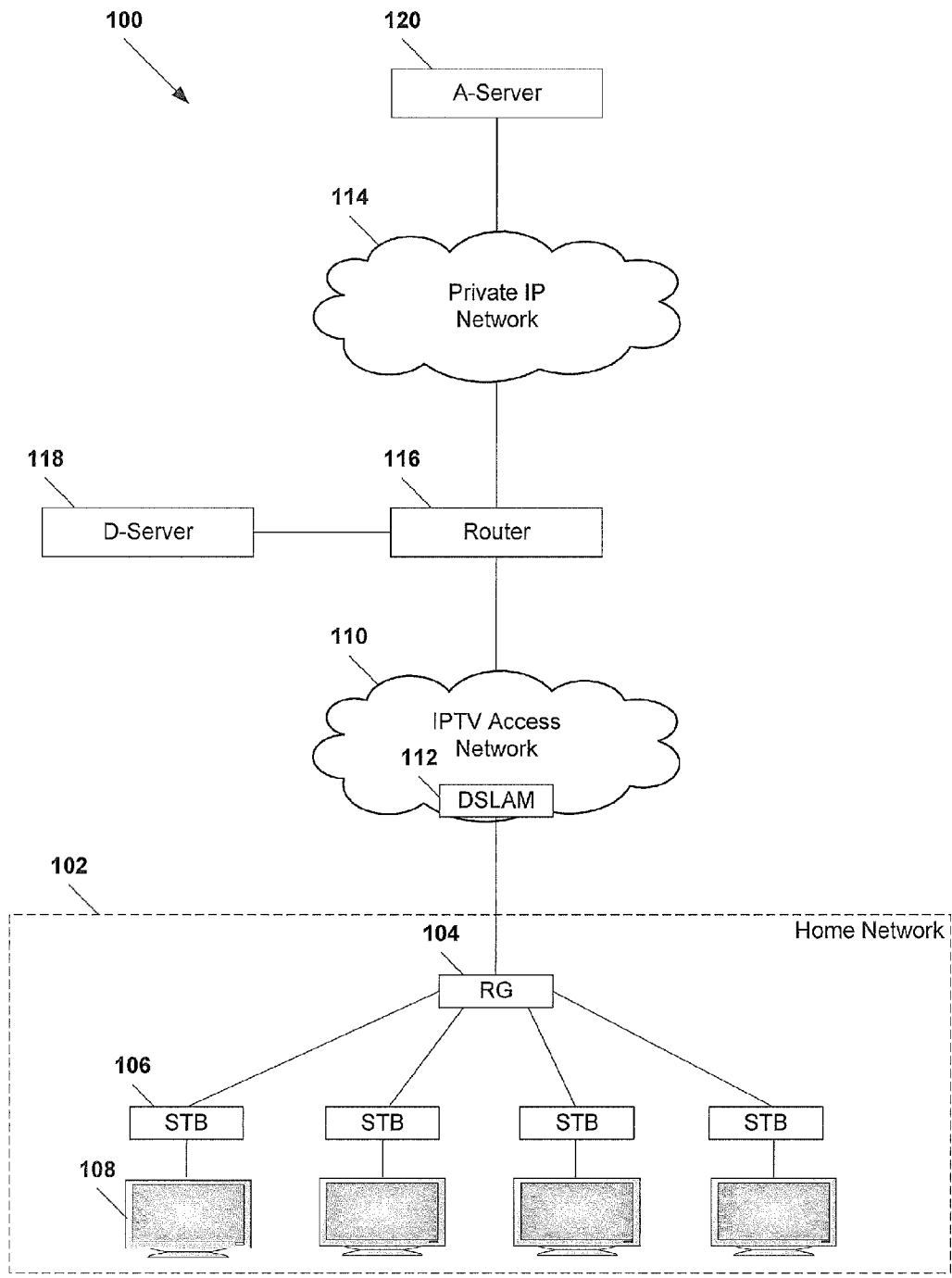
FIG. 1A is a block diagram of a particular embodiment of a system to deliver video content.

A method includes receiving, at a set-top box device, first video content associated with a requested channel from a first source. The method also includes, in response to receiving the first video content, requesting second video content associated with the requested channel from a second source. The method further includes, in response to receiving the second video content from the second source, determining whether at least one data packet associated with the requested channel was not received based on a comparison of first data packets corresponding to the first video content received from the first source and second data packets corresponding to the second video content received from the second source. The method further includes, in response to a determination that at least one data packet was not received, sending a retry request to the first source. The retry request includes an overhead bandwidth factor.

In another embodiment, an apparatus includes processing logic and a memory accessible to the processing logic. The memory includes instructions executable by the processing logic to execute a method. The method includes, receiving, at a set-top box device, first video content associated with a requested channel from a first source. The method also includes, in response to receiving the first video content, requesting second video content associated with the requested channel from a second source. The method further includes, in response to receiving the second video content from the second source, determining whether at least one data packet associated with the requested channel was not received based on a comparison of first data packets corresponding to the first video content received from the first source and second data packets corresponding to the second video content received from the second source. The method further includes, in response to a determination that at least one data packet was not received, sending a retry request to the first source. The retry request includes an overhead bandwidth factor.

In another particular embodiment, a non-transitory computer-readable medium is disclosed having processor-readable instructions that are executable by a processor to execute a method. The method receiving, at a set-top box device, first video content associated with a requested channel from a first source. The method also includes, in response to receiving the first video content, requesting second video content associated with the requested channel from a second source. The method further includes, in response to receiving the second video content from the second source, determining whether at least one data packet associated with the requested channel was not received based on a comparison of first data packets corresponding to the first video content received from the first source and second data packets corresponding to the second video content received from the second source. The method further includes, in response to a determination that at least one data packet was not received, sending a retry request to the first source. The retry request includes an overhead bandwidth factor.

Referring to FIG. 1, a particular embodiment of a system to deliver video content is illustrated and designated generally 100. The system 100 includes a home network 102 having a residential gateway 104 communicating with a plurality of set-top box devices 106 that are coupled to a plurality of display devices 108. The plurality of set-top box devices 106 can communicate with a D-server 118 via an Internet Protocol Television (IPTV) access network 110. In an illustrative embodiment, the IPTV access network 110 can include a very-high speed digital subscriber line (VDSL) network 110 that includes a digital subscriber line access multiplexer (DSLAM) 112 communicating with the residential gateway 104.

The D-server 118 can be a dedicated channel change server, dedicated packet recovery server, or a combination thereof. In an illustrative embodiment, the residential gateway 104 can facilitate communication between the plurality of set-top box devices 106 and the IPTV access network 110. The D-Server 118 can communicate with the IPTV access network 110 via a network router 116, such as a router of a regional or metropolitan video distribution hub. In addition, one or more video sources, such as the A-server 120, can communicate with the IPTV access network 110 via a private IP network 114, such as an IP backbone network or core IP network. The A-server 120 can be located at a video head-end office, such as a national or super video head-end.

The D-Server 118 can buffer video content of a plurality of channels that it receives from the A-Server 120. Upon receiving a channel change request, the D-server 118 can unicast IP data packets that include video content of a requested channel to the requesting set-top box device 106 at an increased rate equal to the subscribed bandwidth associated with the set-top box device 106, plus an overhead bandwidth corresponding to the overhead bandwidth factor, until an amount of video content buffered at the D-Server 118 for the requested channel is sent to the set-top box device 106. After the D-server 118 sends all the buffered data to the set-top box device 106, the D-server 118 can reduce the rate at which it transmits video content of the requested channel to the set-top box device 106 to the normal bandwidth allotted to the set-top box device 106. Additionally, the D-server 118 can send an instruction to the set-top box device 106 to send a join request to a multicast video server, such as the A-server 120, to join a multicast group associated with the requested channel.

In a particular, illustrative embodiment, one of the set-top box devices 106 can receive a channel change request from a viewer of a display device 108 coupled to the set-top box device 106. In response to the channel change request, the set-top box device 106 can send a channel change data packet to the D-server 118 via the IPTV access network 110. The channel change data packet can indicate a requested channel and an overhead bandwidth factor (E), which can represent a ratio between overhead bandwidth to be used to send video in response to the channel change request and a nominal bandwidth typically used to send video to the set-top box device 106. The overhead bandwidth factor E can range, for example, from 0.1 to 1, indicating that video would be sent in response to a channel change request at an increased rate of (1+E) times the nominal bandwidth (e.g., 1.1 to 2 times the nominal bandwidth) until a pre-buffer queue at the set-top box device 106 is filled or the set-top box device 106 joins a multicast group associated with the requested channel.

In one example, the set-top box device 106 may receive high definition (HD) programming at a nominal bandwidth of 10 megabytes per second (Mbps). If the channel is changed, video of the new channel can be streamed to the set-top box device 106 from the D-server 118 at a rate of 11 Mbps, if E=0.1, until a pre-buffer queue is full at the set-top box device 106.

In another example, the overhead bandwidth factor can be within a range such that a total rate used to send video content to the set-top box device is faster than the set-top box device can decode video content, but not more than a total bandwidth allocated to the viewer's premise (e.g., 25 Mbps). Thus, if the subscribed bandwidth associated with the set-top box device 106 is equal to 2 Mbps, and E=1, the D-server 118 can determine an overhead bandwidth of 2 Mbps corresponding to the set-top box device 106. Hence, the D-server 118 can send video content of a requested channel to the set-top box device 106 at a rate of twice the subscribed bandwidth, or 4 Mbps, until a buffer at the set-top box device 106 is filled with video content of the requested channel.

After the set-top box device 106 begins receiving video in response to a channel change request, the set-top box device 106 can send a join request, such as an IGMP join request, to the A-server 120. After the set-top box device 102 begins receiving data packets from the A-server 120 that include video content associated with the requested channel, the set-top box device 106 can send a stop indication to the D-server 118, and the D-server 118 can stop unicasting video content to the set-top box device 106 in response to the stop indication. In an illustrative, non-limiting embodiment, the set-top box device 106 can determine whether there is a gap between the unicast video content received from the D-server 118 and the multicast video content received from the A-server 120. If the set-top box device 106 determines that there is such a gap, the set-top box device 106 can send a retry request to the D-server 118 requesting that lost packets be re-sent. The retry request can include an overhead bandwidth factor, which may be equal to or different than the overhead bandwidth factor corresponding to the channel change request. In response to the retry request, the D-server 118 can re-send one or more data packets that include video content of the requested channel to fill the gap. The re-sent data packets can be transmitted at an increased rate corresponding to the overhead bandwidth factor.

While it may be desirable in some cases to set the overhead bandwidth factor E as high as possible, in order to speed the transmission of channel change video or lost packets, setting the overhead bandwidth factor too high can cause the bandwidth of the IPTV access network 110 to be exceeded. This can cause persistent packet loss and video quality degradation. For instance, if two set-top box devices 106 are receiving HD content, the total bandwidth used at the home network (if no additional voice, video or data services are being used) can be 20 Mbps. If E is set to 1 when one of the set-top box devices changes channels, then the traffic becomes 30 Mbps (i.e., 20 Mbps for the set-top box device receiving the new channel, plus 10 Mbps for the other set-top box device). If both set-top box devices change channels, the total traffic can be 40 Mbps with E set to 1. Thus, the traffic can significantly exceed the bandwidth allotted to the home network 102. Moreover, the total bandwidth may be exceeded at the physical layer of the IPTV access network 110, causing severe packet loss to other home networks.

As an alternative, E may be set to 0.1 or 0.2 to avoid exceeding the IPTV access network bandwidth. Thus, for both set-top box devices to change channels in HD, the total bandwidth could be as low as 22 Mbps. However, this prolongs the channel change process, in addition to increasing channel change traffic volume. The increased traffic can eventually impact the core network, such as the private IP network 114, especially if multiple channels are changed or during peak television viewing hours. Additionally, if E is set to 0.1, lost packet recovery can be ten times longer than when E is set to 1.

Consequently, the set-top box device 106, the D-server 118, or any combination thereof, are adapted to dynamically determine the overhead bandwidth factor E in response to individual channel change requests and lost packet recovery requests. The overhead bandwidth factor E can be determined by estimating the available bandwidth with respect to the home network 102 and the IPTV access network 110 and requesting that the D-server 118 allots overhead bandwidth accordingly.

In an illustrative embodiment, the home network 102 can be allotted a maximum total bandwidth to be used for IPTV traffic, $B_{IPTV}$, when IPTV service is provisioned. The remaining bandwidth, $B_{RM}$ at the home network 102 at any time can be calculated as:

$$B_{RM} = B_{IPTV} - (N_{HD} * B_{HD} + N_{SD} * B_{SD} + B_E),$$

where $N_{HD}$=number of set-top box devices receiving HD content; $B_{HD}$=nominal bandwidth used to send HD content to a single set-top box device; $N_{SD}$=number of set-top box devices receiving standard definition (SD) content; $B_{SD}$=nominal bandwidth used to send standard definition content to a single set-top box device; and $B_E$=any overhead bandwidth being used by the home network 102.

Remaining bandwidth can be updated for the home network 102 at the D-server 118, at one or more of the set-top box devices 106, or any combination thereof, in response to state changes at the set-top box devices 106. Table 1 illustrates types of state changes and corresponding remaining bandwidth updates:

TABLE 1

| STB State Changes | $B_{RM}$ Update |
| --- | --- |
| Starts a HD channel | $B_{RM} = B_{RM(PREV)} - B_{HD}$ |
| Stops a HD channel | $B_{RM} = B_{RM(PREV)} + B_{HD}$ |
| Change channel from HD to HD | $B_{RM} = B_{RM(PREV)} - E_{LIMIT} * B_{HD}$ |
| Change channel from HD to SD | $B_{RM} = B_{RM(PREV)} + B_{HD} - (1 + E_{LIMIT}) * B_{SD}$ |
| Change channel from HD completed | $B_{RM} = B_{RM(PREV)} + E_{LIMIT} * B_{HD}$ |
| HD channel lost packet recovery starts | $B_{RM} = B_{RM(PREV)} - E_{LIMIT} * B_{HD}$ |
| HD channel lost packet recovery completes | $B_{RM} = B_{RM(PREV)} + E_{LIMIT} * B_{HD}$ |
| Start to SD channel | $B_{RM} = B_{RM(PREV)} - B_{SD}$ |
| Stop SD channel | $B_{RM} = B_{RM(PREV)} + B_{SD}$ |
| Change channel from SD to SD | $B_{RM} = B_{RM(PREV)} - E_{LIMIT} * B_{SD}$ |
| Change channel from SD to HD | $B_{RM} = B_{RM(PREV)} + B_{SD} - (1 + E_{LIMIT}) * B_{HD}$ |
| Change channel to SD completed | $B_{RM} = B_{RM(PREV)} + E_{LIMIT} * B_{SD}$ |
| SD channel lost packet recovery start | $B_{RM} = B_{RM(PREV)} - E_{LIMIT} * B_{SD}$ |
| SD channel lost packet recovery completes | $B_{RM} = B_{RM(PREV)} + E_{LIMIT} * B_{SD}$ |

In order to avoid an overhead bandwidth that exceeds limits for the home network 102 and the IPTV access network 110, an upper limit for the overhead bandwidth factor, or $E_{LIMIT}$, can be calculated:

$$E_{LIMIT} = \min\left\{1, \frac{B_{RM} + n_{HSD} * (B_{HD} - B_{SD}) + n_{SHD} * (B_{SD} - B_{HD}) - n_{HDa} * B_{HD} - n_{SDa} * B_{SD})}{(n_{HD} + n_{SHD} + n_{HDa}) * B_{HD} + (n_{SD} + n_{HSD} + n_{SD_a}) * B_{SD}}\right\}$$

where $n_{HD}$=a number of set-top box devices requesting HD to HD channel change; $n_{HSD}$=a number of set-top box devices requesting HD to SD channel change; $n_{HDa}$=a number of set-top box devices going from start-up to requesting a HD channel; $n_{SD}$=a number of set-top box devices requesting SD to SD channel change or SD lost packet recovery; $n_{SHD}$=a number of set-top box devices requesting SD to HD channel change; and $n_{SDa}$=a number of set-top box devices going from start-up to requesting a SD channel.

In a particular embodiment, the $E_{LIMIT}$ can be restricted not to exceed 1. Additionally, the $E_{LIMIT}$ can be restricted not to fall below 0.1, such that there is sufficient overhead bandwidth for instant channel change or packet recovery. Thus, if the calculated $E_{LIMIT}$ exceeds 1, the $E_{LIMIT}$ used to transmit video or lost packets is 1. Whereas, if the calculated $E_{LIMIT}$ is between 0.1 and 1, the calculated $E_{LIMIT}$ is used, and the remaining bandwidth is updated using the formula $$B_{RM} + n_{HSD} * (B_{HD} - B_{SD}) + n_{SHD} * (B_{SD} - B_{HD}) - n_{HDa} * B_{HD} - n_{SDa} * B_{SD})$$

If the calculated $E_{LIMIT}$ is less than 0.1, bandwidth occupied by channels on which there is no subscriber activity for a pre-defined period of time can be used for channel change and packet recovery. Alternatively, the channel change or lost packet recovery request can be denied.

In other embodiments, the upper limit overhead bandwidth factor $E_{LIMIT}$ can be estimated based on a number of active set-top box devices in the home network 102. For instance, $E_{LIMIT}$ can be allocated based on the number of set-top box devices associated with HD channels ($N_{HD}$) and the number of set-top box devices associated with SD channels ($N_{SD}$), where $N_{HD}$ and $N_{SD}$, take into account channel changes and set-top box start-ups during a synchronization period ($T_H$). Thus, $E_{LIMIT}$ can be estimated as:

$$E_{LIMIT} = \min\left\{1, \frac{B_{IPTV}}{N_{HD} * B_{HD} + N_{SD} * B_{SD}} - 1\right\}$$

In an illustrative, non-limiting embodiment, a set-top box device or server that provides $E_{LIMIT}$ values can be adapted to store a table of $E_{LIMIT}$ values corresponding to varying values of $N_{HD}$ and $N_{SD}$ such that $E_{LIMIT}$ need not be calculated for every bandwidth change request.

In still other embodiments, $E_{LIMIT}$ values can be estimated by assuming a worst-case traffic scenario based on a number of active set-top box devices and a maximum allowable number of set-top box devices tuned to HD channels. In this embodiment, $E_{LIMIT}$ can be estimated as:

$$E_{LIMIT} = \min\left\{1, \frac{B_{IPTV}}{\min(N_{HD} + N_{SD}, \max N_{HD}) * B_{HD} + (N_{HD} + N_{SD} - \min(N_{HD} + N_{SD}, \max N_{HD})) * B_{SD}} - 1\right\}$$

Calculation of overhead bandwidth factors and remaining bandwidth for a home network can be performed by one or more set-top box devices 106 in the home network 102, at a D-server 110, at another device, or any combination thereof. In a particular, illustrative embodiment, the set-top box devices 106 within the home network 102 can be adapted to dynamically select a master set-top box device to track remaining bandwidth for the home network 102 and to determine overhead bandwidth factors for all set-top box devices requesting a bandwidth change, such as a channel change or lost packet recovery. For instance, when a set-top box device powers on, it can broadcast a notification that it is active to other set-top box devices of the home network 102 via the residential gateway 104. If the set-top box device 106 receives no response from other set-top box devices of the home network 102, the set-top box device can designate itself as a master set-top box device for the home network 102.

When a state change occurs at the master set-top box device the master set-top box device can update a remaining bandwidth ($B_{RM}$) related to the home network 102. If the state change includes an instant channel change request or a lost packet recovery request, the master set-top box device can calculate an overhead bandwidth factor ($E_{LIMIT}$). The master set-top box device can send its channel change or packet recovery request to the D-Server 118 with the $E_{LIMIT}$ value encapsulated in the request packet. The master set-top box device can receive the channel change packets or lost data packets that it has requested from the D-Server 118.

The master set-top box device can also receive notifications of state changes from slave set-top box devices within the home network 102. If the master set-top box device has received a notification of a state change at a slave set-top box device, the master set-top box device can update the remaining bandwidth ($B_{RM}$) related to the home network. If the state change includes an instant channel change request or a lost packet recovery request, the master set-top box device can calculate an overhead bandwidth factor ($E_{LIMIT}$) and send the $E_{LIMIT}$ value to the slave set-top box device. The slave set-top box device can send its channel change or packet recovery request to a D-Server 118 with the $E_{LIMIT}$ value encapsulated in the request packet. Alternatively, the master set-top box device can send the request to the D-server 118 on behalf of the slave set-top box device.

In another embodiment, each set-top box device 106 within a home network can independently and redundantly track remaining bandwidth ($B_{RM}$) related to the home network 102 based on notifications of state changes from the other active set-top box devices. In this embodiment, remaining bandwidth can be updated immediately for stop events and completed events. For other state changes, a set-top box device can start a hold-down time ($T_H$) to allow state changes at other set-top box devices to initiate, resolve, or synchronize, before calculating remaining bandwidth and, thus, determining necessary an overhead bandwidth factors ($E_{LIMIT}$).

In a particular embodiment, a configurable lost packet threshold ($L_{TH}$) can be set to a number of packets that the DSLAM 112 can absorb. If fewer than the threshold number of lost packets are to be recovered, the remaining bandwidth updating process and the $E_{LIMIT}$ calculation process can be skipped. The DSLAM 112 can buffer the retransmitted packets for a short period of time if no bandwidth is available.

The D-server 118 can respond to channel change and lost packet recovery requests by calculating an overhead bandwidth factor ($E_{opt}$) that represents the overhead bandwidth that the D-server 118 can support based on its central processing unit (CPU) load(s). The D-server 118 can then set the overhead bandwidth factor used to send content to the requesting set-top box device at E=min{$E_{opt}$, $E_{LIMIT}$}.

In yet another embodiment, the D-server 118 can monitor active set-top box devices within the home network 102. The D-server 118 can receive a notification of a state change at one of the active set-top box devices and update a remaining bandwidth ($B_{RM}$) related to the home network 102. If the state change requires an overhead bandwidth, the D-server 118 can calculate an overhead bandwidth factor ($E_{LIMIT}$) related to the home network 102. The D-server 118 can send channel change or recovery packets to the requesting set-top box device using an overhead bandwidth corresponding to the overhead bandwidth factor ($E_{LIMIT}$). For example, where the overhead bandwidth factor ($E_{LIMIT}$) is equal to one, the D-server 118 can send packets to the requesting set-top box device at twice the normal rate at which video content or other data is sent to the set-top box device.

Figure 1B:
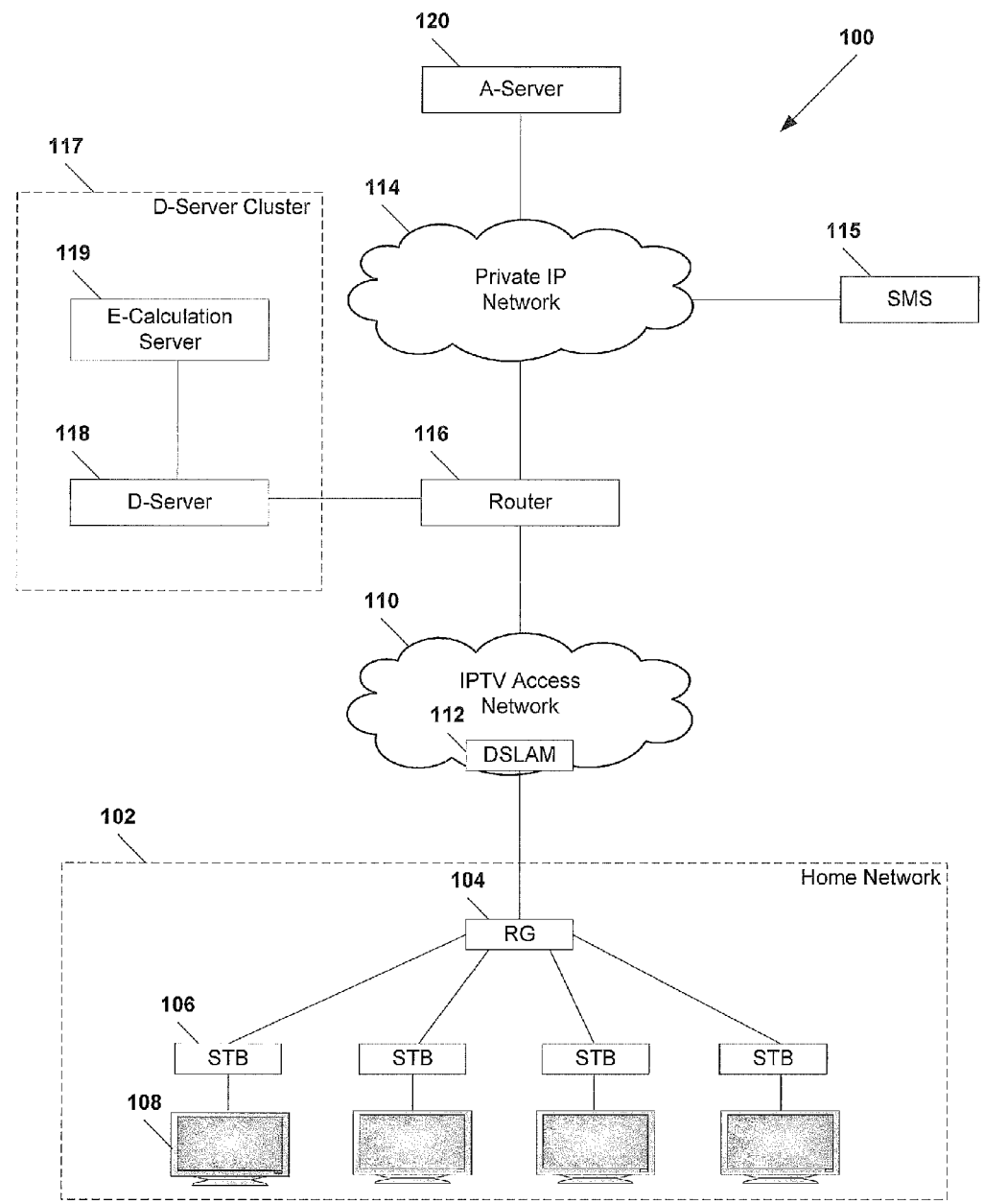
FIG. 1B is a block diagram of a second particular embodiment of a system to deliver video content.

Alternatively, as shown in FIG. 1B, the D-server 118 can be included in a cluster of servers 117 that includes the D-server 118 and an overhead bandwidth factor calculation server (E-calculation server) 119. The E-calculation server 119 can be a server that is dedicated to calculating overhead bandwidth factors and remaining bandwidth for the home network 102, or the E-calculation server 119 can be a D-server that calculates overhead bandwidth factors and remaining bandwidths in addition to delivering video content in response to channel change requests, lost packet recovery requests, or a combination thereof. In the embodiment shown in FIG. 1B, the E-calculation server 119 can gain information regarding individual set-top box devices and home networks (e.g., $B_{IPTV}$, $N_{HD}$, $N_{SD}$, $B_E$, etc.), via a subscriber management system 115.

In an illustrative embodiment, when the D-server 118 receives a channel change or lost packet recovery request, the D-server 118 informs the E-calculation server 119 about the application for the overhead bandwidth (e.g., SD to HD channel change, lost packet recovery, etc.) requests an $E_{LIMIT}$ from the E-calculation server 119. The E-calculation server 119 can follow rules similar to those used by a master set-top box device to calculate $E_{LIMIT}$, $B_{RM}$, or any combination thereof. For instance, if $E_{LIMIT}$<0.1, the E-calculation server 119 can return an $E_{LIMIT}$ value of zero, and if $E_{LIMIT}$>1, the E-calculation server 119 can return an $E_{LIMIT}$ value of one. The E-calculation server 119 does not return values to the set-top box devices. Rather, it returns $E_{LIMIT}$ values to the D-server 118 that received the channel change or lost packet request.

In another illustrative embodiment, a set-top box device 106 can send channel change or lost packet requests directly to the E-calculation server 119. The set-top box device 106 can indicate the bandwidth change type, such as channel change, lost packet recovery, or starting to receive signal from inactive state. If $E_{LIMIT}$ is less than 0.1, the E-calculation server 119 can return an $E_{LIMIT}$ value of zero to the set-top box device 106, and the set-top box device 106 can retry its request at a randomized time interval. Alternatively, if $E_{LIMIT}$ is greater than or equal to 0.1, the E-calculation server 119 can select a D-server with fewer loads to handle the request from the set-top box device 106. The E-calculation server 119 can insert an $E_{LIMIT}$ into the set-top box request and send the request to the selected D-server. The selected D-server can notify the E-calculation server 119 once the bandwidth change event is completed, and the E-calculation server 119 can update the remaining bandwidth $B_{RM}$ associated with the home network 102.

Figure 2:
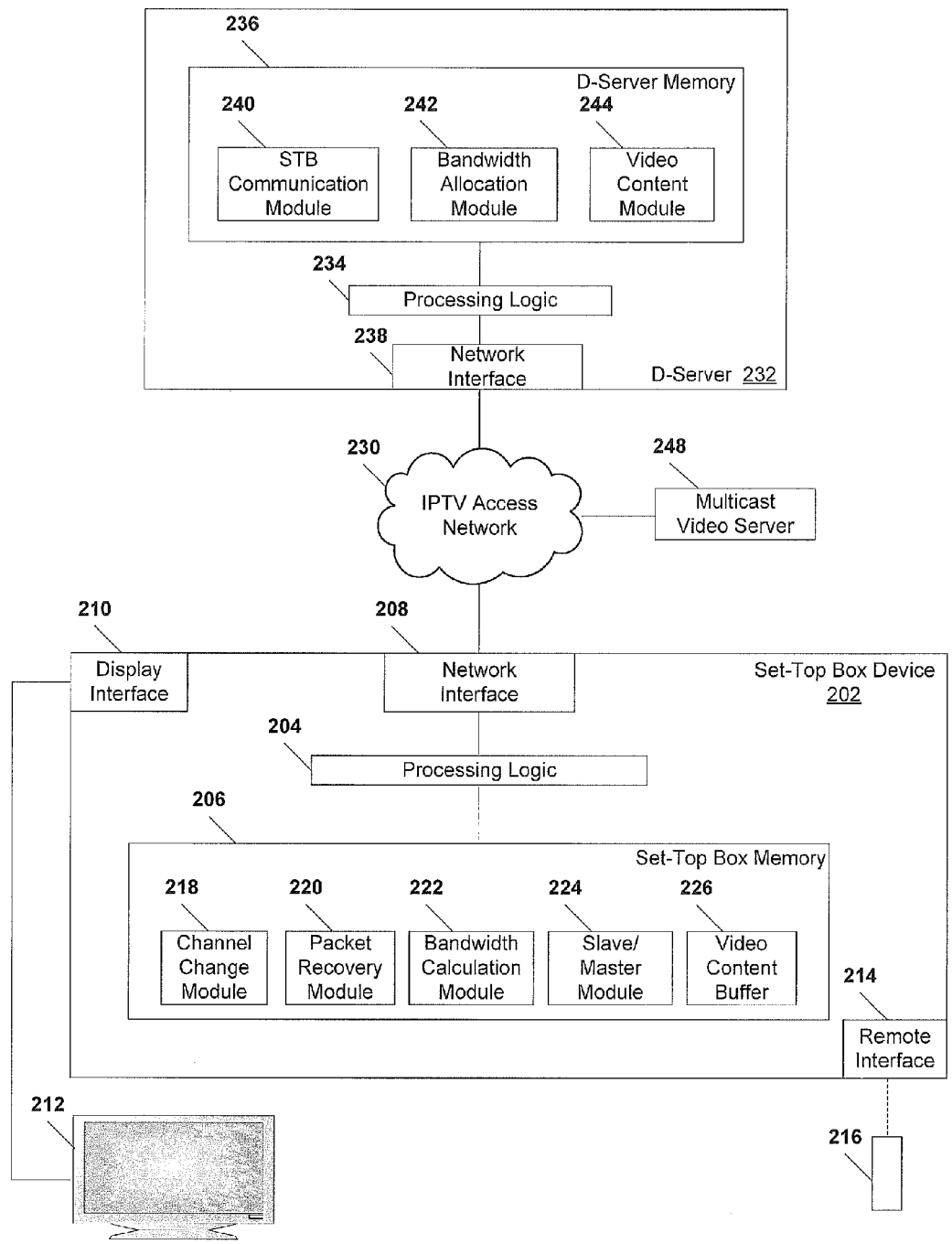
FIG. 2 is a block diagram of a third particular embodiment of a system to deliver video content.

Referring to FIG. 2, a third particular embodiment of a system to deliver video content is illustrated. The system 200 includes a set-top box device 202 communicating with a D-server 232 via an Internet Protocol Television (IPTV) access network 230. The set-top box device 202 can be one of a plurality of set-top box devices of a home network communicating with the IPTV access network 230. The D-server 232 can be one of a plurality of D-servers within a D-server cluster. At least one multicast video server 248 can also communicate with the IPTV access network 230.

The set-top box device 202 includes processing logic 204 and memory 206 accessible to the processing logic 204. The set-top box device 202 can also include a display interface 210 coupled to a display device 212 and a remote interface 214 that communicates with a remote control device 216. Further, the set-top box device includes a network interface 208 that facilitates communication between the set-top box device 202 and the IPTV access network 230. In an illustrative embodiment, the network interface 208 can be coupled to a residential gateway device or other home network device and can also facilitate communication between the set-top box device 202 and other set-top box devices of a home network.

The memory 206 includes various modules 218-226 that are adapted to provide functions of the set-top box device 202 with respect to the delivery of video content. In one embodiment, the modules 218-226 can include instructions executable by the processing logic 204, such as instructions included in one or more applications, operating systems, other software, or any combination thereof, stored at the set-top box device 202. In other embodiments, the modules 218-226 can include hardware logic or a combination of hardware logic and software instructions.

In a particular embodiment, the memory 206 can include a channel change module 218 that is executable by the processing logic 204 to receive a channel change command from the remote control device 216 and to send a channel change request packet to the D-server 232. The channel change request packet can include data indicating a requested channel and an overhead bandwidth factor. The channel change module 218 can be executable by the processing logic 204 to send the channel change request packet to the D-server 232 directly from the set-top box device 202 or via a master set-top box device with which the set-top box device 202 communicates. In an illustrative embodiment, the channel change module 218 can be executable by the processing logic 204 to send a stop request to the D-server 232 indicating that the set-top box device 202 has been joined with a multicast group of the requested channel, such that the D-server 232 can stop sending video packets of the requested channel to the set-top box device 202.

In a particular embodiment, the memory 206 includes a lost packet recovery module 220 that is executable by the processing logic 204 to determine whether a gap exists between video packets received from the D-server 232 in response to a channel change request and video packets received from the multicast video server 248 after the set-top box device 202 has been joined with a multicast group of the requested channel. If such a gap exists, the packet recovery module 220 is executable by the processing logic 204 to send a request for lost video packets to the D-server 232. The lost packet recovery request can identify lost packets to be re-sent and can include an overhead bandwidth factor.

In a particular embodiment, the memory 206 includes a bandwidth calculation module 222 that is executable by the processing logic 204 to calculate overhead bandwidth factors indicating a percentage or multiple of the normal bandwidth allocated to the set-top box device 202 (or to another set-top box device of a home network), where the overhead bandwidth factors can be used to allocate additional bandwidth to the set-top box device 202 (or to another set-top box device of a home network) for sending video packets in response to channel change, lost packet recovery request, or combinations thereof. In addition, the bandwidth calculation module 222 is executable by the processing logic 204 to calculate and update remaining bandwidth for a home network, based on state changes of the set-top box device 202 and of other set-top box devices of the home network.

In a particular embodiment, the memory 206 includes a slave/master module 224 that is executable by the processing logic 204 to determine whether the set-top box device 202 is to perform functions of a master set-top box device, such as calculating overhead bandwidth factors for itself and other set-top box devices in a home network; tracking state changes of itself and other set-top box devices in the home network and updating a remaining bandwidth value based thereon; communicating bandwidth change requests to the D-server 232 on behalf of itself; communicating bandwidth change requests to the D-server 232 on behalf of other set-top box devices in the home network; or any combination thereof. The slave/master module 224 is also executable by the processing logic 204 to determine whether the set-top box device 202 is to perform functions of a slave set-top box device, such as reporting state changes to a master set-top box device; receiving overhead bandwidth factors from the master set-top box device in response to bandwidth change requests; communicating bandwidth change requests to the D-server 232 on behalf of itself; communicating bandwidth change requests to the master set-top box device for forwarding to the D-server 232; or any combination thereof.

In a particular embodiment, the memory 206 can include a video content buffer 226 to buffer video content received from the multicast video server 248 and the D-server to prevent underflow to the display device 212.

The D-server 232 includes processing logic 234 and memory 236 accessible to the processing logic 234. The D-server 232 also includes a network interface 238 that facilitates communication between the D-server 232 and the IPTV access network 230. The memory 236 includes various modules 240-244 that are adapted to provide functions of the D-server 232 with respect to the delivery of video content. In one embodiment, the modules 240-244 can include instructions executable by the processing logic 234, such as instructions included in one or more applications, operating systems, other software, or any combination thereof, stored at the D-server 232. In other embodiments, the modules 240-244 can include hardware logic or a combination of hardware logic and software instructions.

In a particular embodiment, the memory 236 includes a set-top box communication module 240 that is executable by the processing logic 234 to receive bandwidth change requests from the set-top box device 202, such as channel change requests, lost packet recovery requests, stop requests, or any combination thereof; and to send video packets to the set-top box device 202 in response to certain bandwidth change requests.

The memory 236 also includes a bandwidth allocation module 242 that is executable by the processing logic 234 to allocate bandwidth to set-top box devices. For example, the bandwidth allocation module 242 can store data indicating normal or allotted bandwidths associated with various set-top box devices and home networks communicating with the IPTV access network 230. Additionally, the bandwidth allocation module 242 can be executable by the processing logic 234 to allocate additional bandwidth to set-top box devices in response to certain bandwidth change requests and to release such additional bandwidth after state changes associated with such bandwidth change requests are resolved. The set-top box communication module 240 can be executable by the processing logic 234 to send video packets to the set-top box devices according to the allocated bandwidths.

In a particular embodiment, the memory 236 can include a video content module 244 that is adapted to receive and store video content for communication to set-top box devices. In an illustrative embodiment, the D-server 232 can receive such video content from an A-server, such as the A-server illustrated in FIGS. 1A-1B, from at least one multicast video server, such as the multicast video server 248, from other content sources, or any combination thereof.

Figure 3:
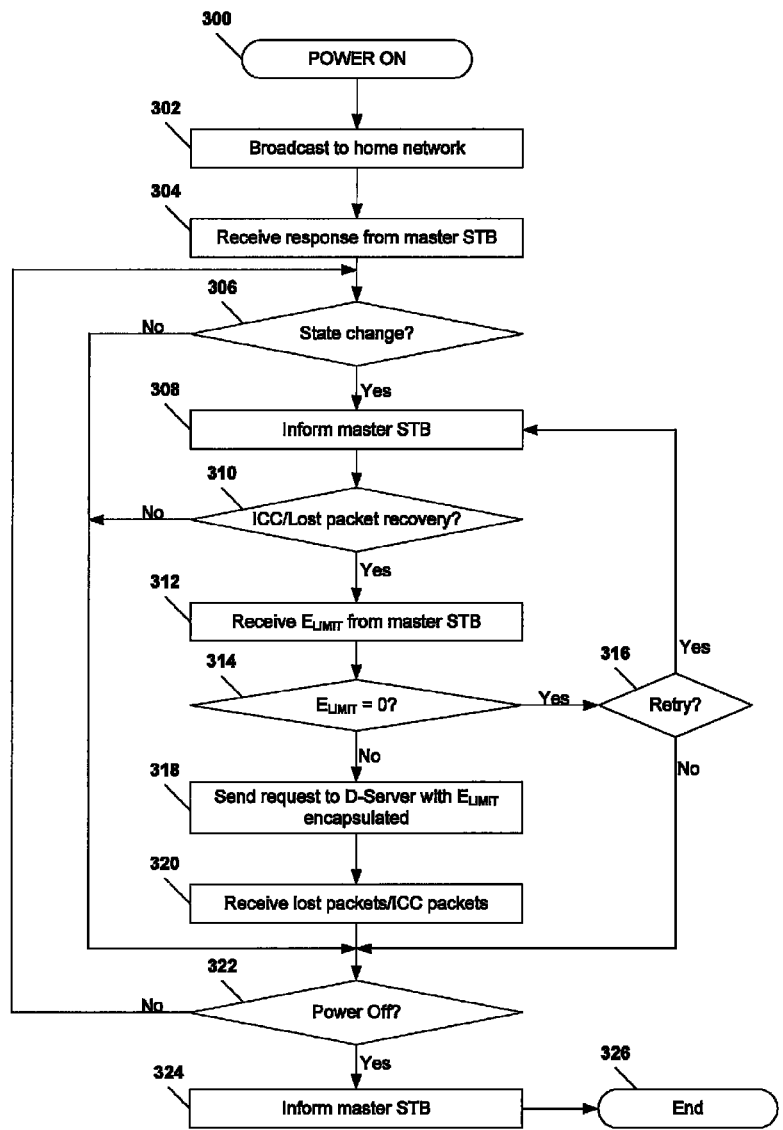
FIG. 3 is a flow diagram of a particular embodiment of a method of delivering video content.

Referring to FIG. 3, a particular embodiment of a method of delivering video content is illustrated. At block 300, a set-top box device powers on. Moving to block 302, the set-top box device broadcasts a notification that it is active to other set-top box devices of a home network, via a residential gateway, for example. Proceeding to block 304, in a particular embodiment, the set-top box device can receive a response from a master set-top box device of the home network, such as a set-top box device that was powered on before all other active set-top box devices in the home network.

Continuing to decision node 306, the set-top box device can determine whether a state change has occurred at the set-top box device. If a state change has not occurred, the method can advance to decision node 322. Conversely, if a state change has occurred, the method can move to block 308, and the set-top box device informs the master set-top box device of the state change. Proceeding to decision node 310, if the state change includes an instant channel change request or a lost packet recovery request, the method can advance to block 312, and the set-top box device can receive a calculated overhead bandwidth factor ($E_{LIMIT}$) from the master set-top box device.

At decision node 314, the set-top box device can determine whether the returned $E_{LIMIT}$ value is equal to zero. If the $E_{LIMIT}$ value is equal to zero, the value can indicate a denial of the channel change/packet recovery request sent by the set-top box device, due to a lack of available overhead bandwidth. The method can move to decision node 316, and the set-top box device can determine whether to retry the request at another time, such as after a randomized delay time has expired or after receiving a notification that another set-top box device has powered off or has completed a channel change or packet recovery process.

Returning to decision node 314, if the $E_{LIMIT}$ value is not equal to zero, the set-top box device can send its channel change or packet recovery request to a D-Server with the $E_{LIMIT}$ value encapsulated in the request packet. Proceeding to block 320, the set-top box device can receive the channel change packets or lost data packets that it has requested from the D-Server. Moving to decision node 322, in one embodiment, the set-top box device can determine whether it has received a command to power off. If it has not received such a command, the method can return to decision node 306. On the other hand, if the set-top box device has received a command to power off, the method can advance to block 324, and the set-top box device can inform the master set-top box device that it is powering off. The method then terminates at 326.

Figure 4:
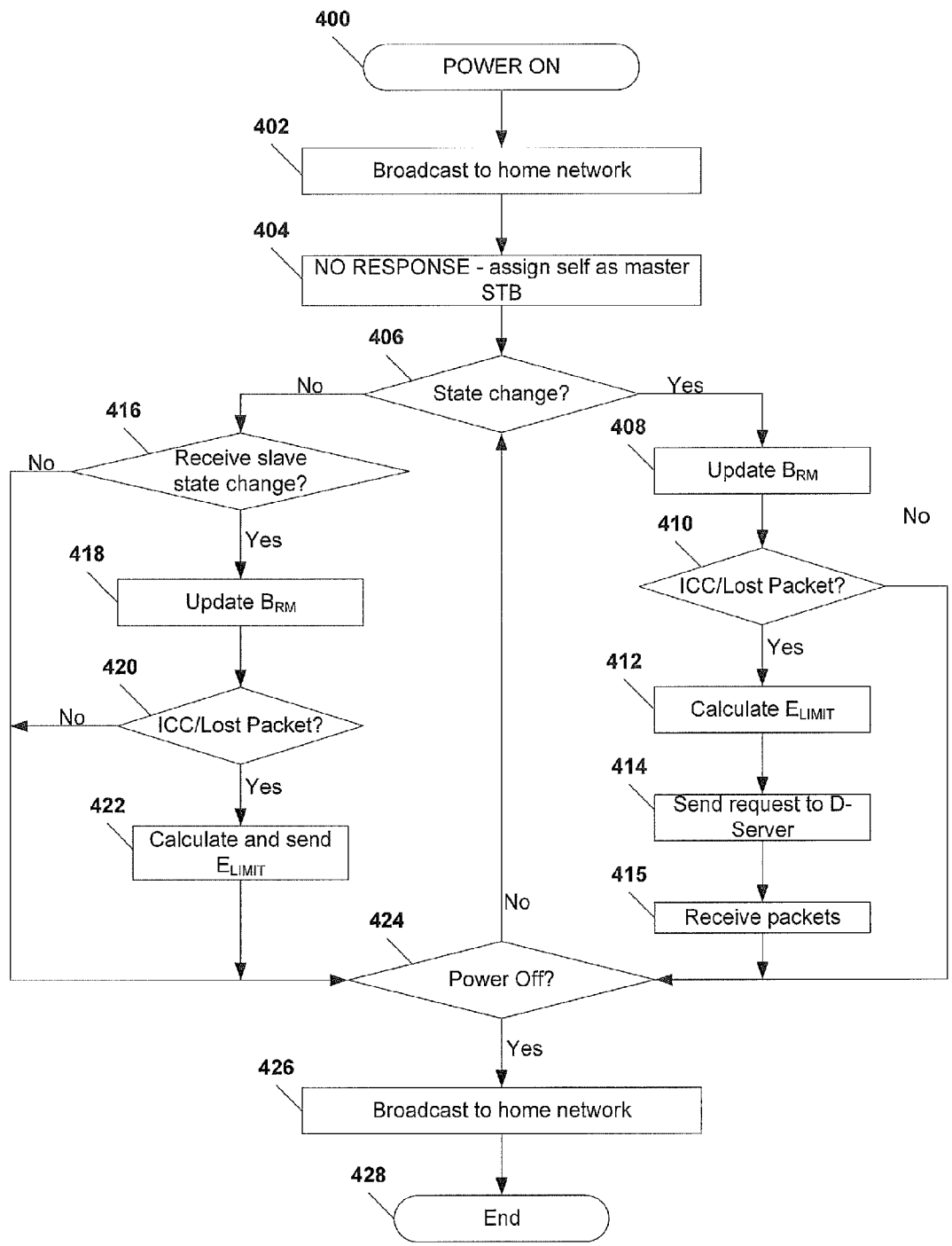
FIG. 4 is a flow diagram of a second particular embodiment of a method of delivering video content.

Referring to FIG. 4, a second particular embodiment of a method of delivering video content is illustrated. At block 400, a set-top box device powers on. Moving to block 402, the set-top box device broadcasts a notification that it is active to other set-top box devices of a home network, via a residential gateway, for example. Proceeding to block 404, in a particular embodiment, the set-top box device receives no response from other set-top box devices of the home network, and the set-top box device designates itself as a master set-top box device for the home network.

Continuing to decision node 406, the master set-top box device can determine whether a state change has occurred at the master set-top box device. If a state change has occurred at the master set-top box device, the method can move to block 408, and the master set-top box device can update a remaining bandwidth ($B_{RM}$) related to the home network. Proceeding to decision node 410, if the state change includes an instant channel change request or a lost packet recovery request, the method can advance to block 412, and the master set-top box device can calculate an overhead bandwidth factor ($E_{LIMIT}$). Moving to block 414, the master set-top box device can send its channel change or packet recovery request to a D-Server with the $E_{LIMIT}$ value encapsulated in the request packet. Proceeding to block 415, the master set-top box device can receive the channel change packets or lost data packets that it has requested from the D-Server.

Returning to decision node 406, if a state change has not occurred at the master set-top box device, the method can proceed to decision node 416, and the master set-top box device can determine whether it has received a notification of a state change from a slave set-top box device, such as a set-top box device within the home network that became active after the master set-top box device became active. If the master set-top box device has received a notification of a state change at a slave set-top box device, the method can move to block 418, and the master set-top box device can update the remaining bandwidth ($B_{RM}$) related to the home network. Proceeding to decision node 420, if the state change includes an instant channel change request or a lost packet recovery request, the method can advance to block 422, and the master set-top box device can calculate an overhead bandwidth factor ($E_{LIMIT}$) and send the $E_{LIMIT}$ value to the slave set-top box device. Moving to block 414, the master set-top box device can send its channel change or packet recovery request to a D-Server with the $E_{LIMIT}$ value encapsulated in the request packet.

At decision node 424, in one embodiment, and the master set-top box device can determine whether it has received a command to power off. If it has not received such a command, the method can return to decision node 406. On the other hand, if the set-top box device has received a command to power off, the method can advance to block 426, and the set-top box device can inform the master set-top box device that it is powering off. The method then terminates at 428.

Figure 5:
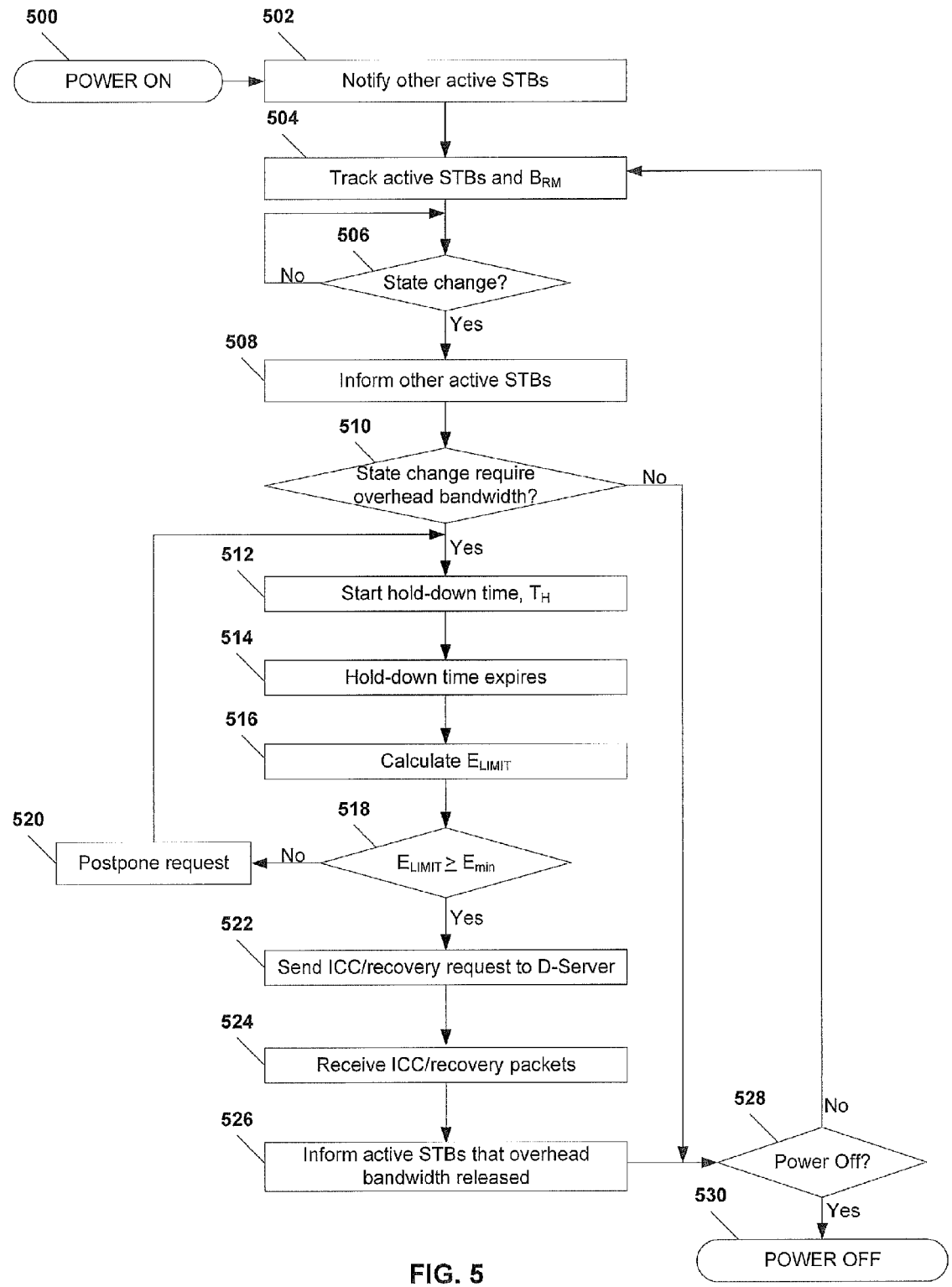
FIG. 5 is a flow diagram of a third particular embodiment of a method of delivering video content.

Referring to FIG. 5, a third particular embodiment of a method of delivering video content is illustrated. At block 500, a set-top box device powers on. Moving to block 502, the set-top box device broadcasts a notification that it is active to other active set-top box devices of a home network. Proceeding to block 504, in a particular embodiment, the set-top box device tracks state changes of the other active set-top box devices and maintains an updated remaining bandwidth ($B_{RM}$) related to the home network based on notifications of state changes from the other active set-top box devices.

Continuing to decision node 506, the set-top box device can determine whether a state change has occurred at the set-top box device. If a state change has occurred at the master set-top box device, the method can move to block 508, and the set-top box device can inform the other active set-top box devices of the state change, such that each active set-top box device can independently maintain an updated remaining bandwidth ($B_{RM}$) related to the home network. Advancing to decision node 510, if the state change requires overhead bandwidth, such as an instant channel change request or a lost packet recovery request, the method can advance to block 512, and the set-top box device can start a hold-down time ($T_H$). At block 514, the hold-down time can expire, and the set-top box device can calculate an overhead bandwidth factor ($E_{LIMIT}$), at block 516, to include with a channel change or lost packet recovery request to a D-Server communicating with the home network.

Moving to decision node 518, the set-top box device can determine whether the overhead bandwidth factor ($E_{LIMIT}$) is greater than or equal to a pre-defined minimum overhead bandwidth factor ($E_{min}$). If the overhead bandwidth factor ($E_{LIMIT}$) is not greater than or equal to a pre-defined minimum overhead bandwidth factor ($E_{min}$), the method can return to 512, and the set-top box device can postpone its request to the D-Server until the overhead bandwidth factor ($E_{LIMIT}$) is greater than or equal to the pre-defined minimum overhead bandwidth factor ($E_{min}$). When the overhead bandwidth factor ($E_{LIMIT}$) is greater than or equal to a pre-defined minimum overhead bandwidth factor ($E_{min}$), the set-top box device can send its channel change or lost packet recovery request to the D-Server, at block 522. The set-top box device can receive channel change or recovery packets at block 524.

Proceeding to block 526, in a particular embodiment, the set-top box device can inform other active set-top box devices within the home network that the overhead bandwidth used for its channel change or packet recovery process has been released. In an illustrative embodiment, the method can include decision node 528, at which the set-top box device can determine whether it has received a command to power off. If it has not received such a command, the method can return to block 504. On the other hand, if the set-top box device has received a command to power off, the method can terminate at 530.

Figure 6:
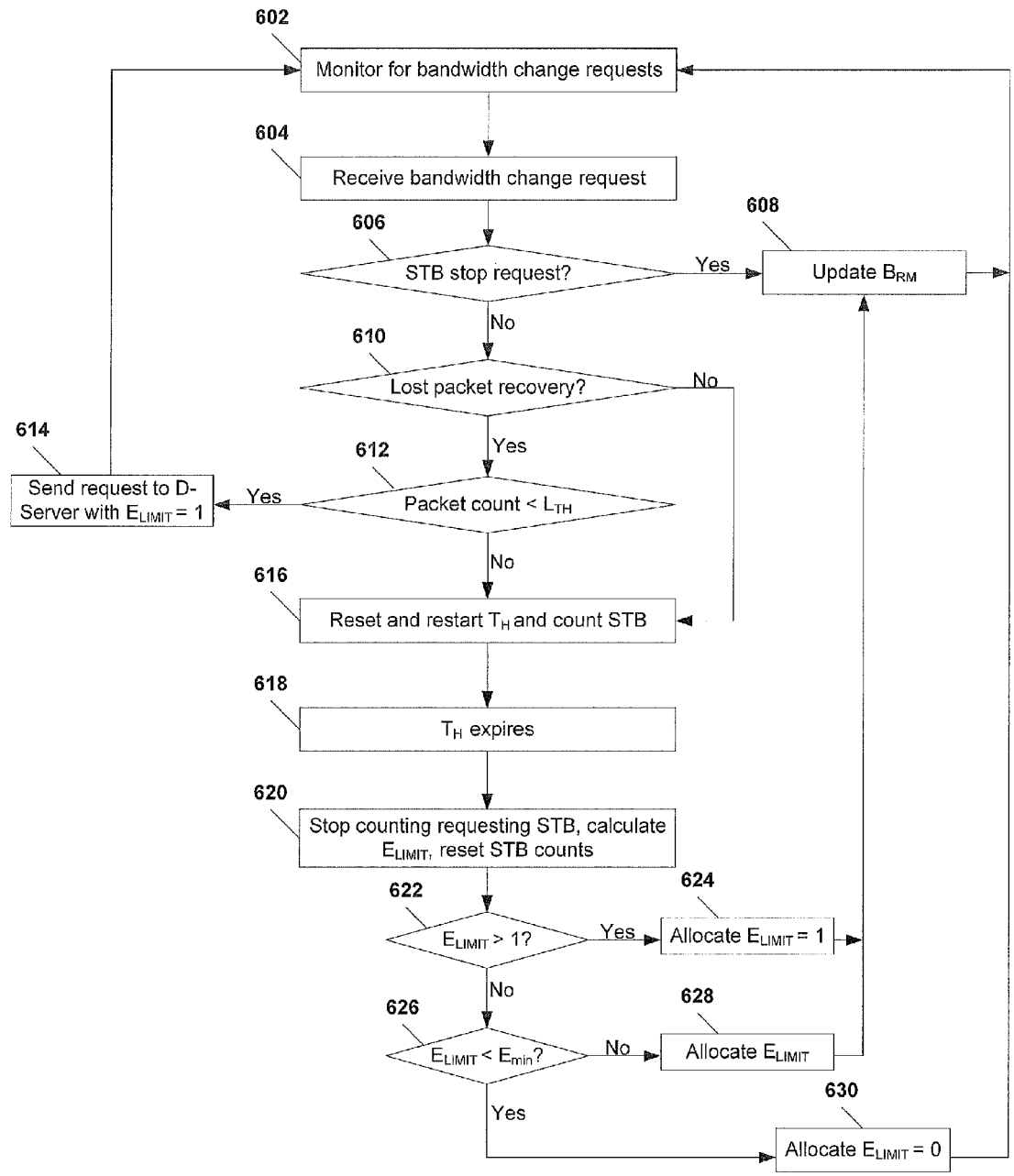
FIG. 6 is a flow diagram of a fourth particular embodiment of a method of delivering video content.

Referring to FIG. 6, a fourth particular embodiment of a method of delivering video content is illustrated. At block 602, a master set-top box device within a home network monitors for bandwidth change requests from other set-top box devices within the home network. Moving to block 604, the master set-top box device receives a bandwidth change request from another set-top box device. Proceeding to decision step 606, the master set-top box device determines whether the bandwidth change request is a stop request, such as a notification that a set-top box device is powering off. If the master set-top box device determines that the bandwidth change request is not a stop request, the method advances to block 608, and the master set-top box device updates a remaining bandwidth ($B_{RM}$) associated with the home network. Conversely, if the master set-top box device determines that the bandwidth change request is not a stop request, the method advances to decision node 610, and the master set-top box device determines whether the bandwidth change request is a lost packet recovery request. If the bandwidth change request is not a lost packet recovery request (e.g., if the request is a channel change request), the method advances to block 616. On the other hand, if the bandwidth change request is a lost packet recovery request, the method continues to decision node 612.

At decision node 612, the master set-top box device determines whether a lost packet count related to the lost packet recovery request is less than a lost packet count threshold ($L_{TH}$). If the master set-top box device determines that the lost packet count is less than the lost packet count threshold, the method moves to block 614, and the master set-top box device can send the lost packet recovery request to a D-server with a maximum overhead bandwidth factor ($E_{LIMIT}$) equal to one, such that the D-server can send the lost packets to the requesting set-top box device (e.g., via the home network) at twice the normal bandwidth. The method can then return to block 602.

Returning to decision node 612, if the master set-top box device determines that the lost packet count is greater than or equal to the lost packet count threshold, the method advances to block 616, and the master set-top box device can reset and restart a hold-down timer ($T_H$) and can add the requesting set-top box device to a count of set-top box devices needing overhead bandwidth. Moving to block 618, the hold-down timer expires. Proceeding to block 620, the master set-top box device stops counting the requesting set-top box device, calculates a maximum overhead bandwidth factor for the requesting set-top box device, and resets the count of set-top box devices.

Continuing to decision node 622, the master set-top box device determines whether the calculated maximum overhead bandwidth factor is greater than one. If the calculated maximum overhead bandwidth factor is greater than one, the method advances to block 624, and the master set-top box device allocates the maximum overhead bandwidth factor to one. The method can then return to 608. On the other hand, if the master set-top box device determines that the calculated maximum overhead bandwidth factor is not greater than one, the method moves to decision node 626, and the master set-top box determines whether the calculated maximum overhead bandwidth factor is less than a minimum overhead bandwidth ($E_{min}$).

If the set-top box determines that the calculated maximum overhead bandwidth factor is not less than the minimum overhead bandwidth, the method proceeds to block 628, and the master set-top box device allocated the maximum overhead bandwidth factor to the calculated value. The method can then return to block 608. Conversely, if the set-top box deter mines that the calculated maximum overhead bandwidth factor is less than the minimum overhead bandwidth, the method continues to block 630, and the master set-top box device allocates the maximum overhead bandwidth value to zero. The method can then return to 602.

Figure 7:
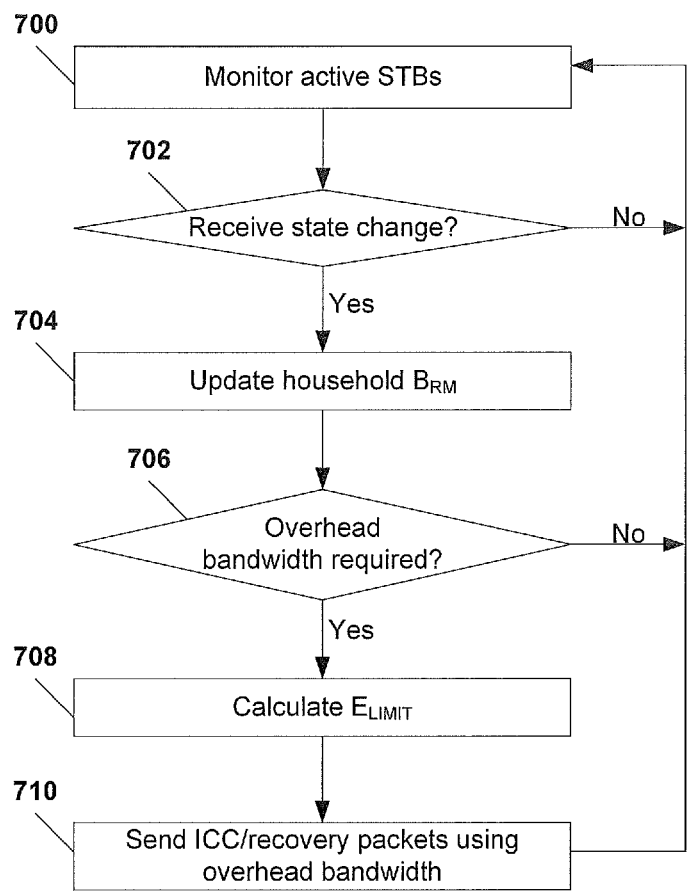
FIG. 7 is a flow diagram of a fifth particular embodiment of a method of delivering video content.

Referring to FIG. 7, a fifth particular embodiment of a method of delivering video content is illustrated. At block 700, a D-Server monitors active set-top box devices communicating with an Internet Protocol Television (IPTV) access network. Moving to decision node 702, the D-Server can determine whether it has received a notification of a state change at one of the active set-top box devices. If the D-Server receives such a notification, the method proceeds to block 704, and the D-Server updates a remaining bandwidth ($B_{RM}$) related to a household or home network associated with the set-top box device.

Continuing to decision node 706, the D-Server can determine whether the state change includes a request that requires an overhead bandwidth, such as an instant channel change request or lost packet recovery request. If the state change does not require an overhead bandwidth, the method can return to block 700. Conversely, if the state change requires an overhead bandwidth, the method advances to block 708, and the D-Server calculates an overhead bandwidth factor ($E_{LIMIT}$) related to the household. Moving to block 710, the D-Server sends channel change or recovery packets to the requesting set-top box device using an overhead bandwidth corresponding to the overhead bandwidth factor ($E_{LIMIT}$). For example, where the overhead bandwidth factor ($E_{LIMIT}$) is equal to one, the D-Server can send packets to the requesting set-top box device at twice the normal rate. The method can return to block 700.

Figure 8:
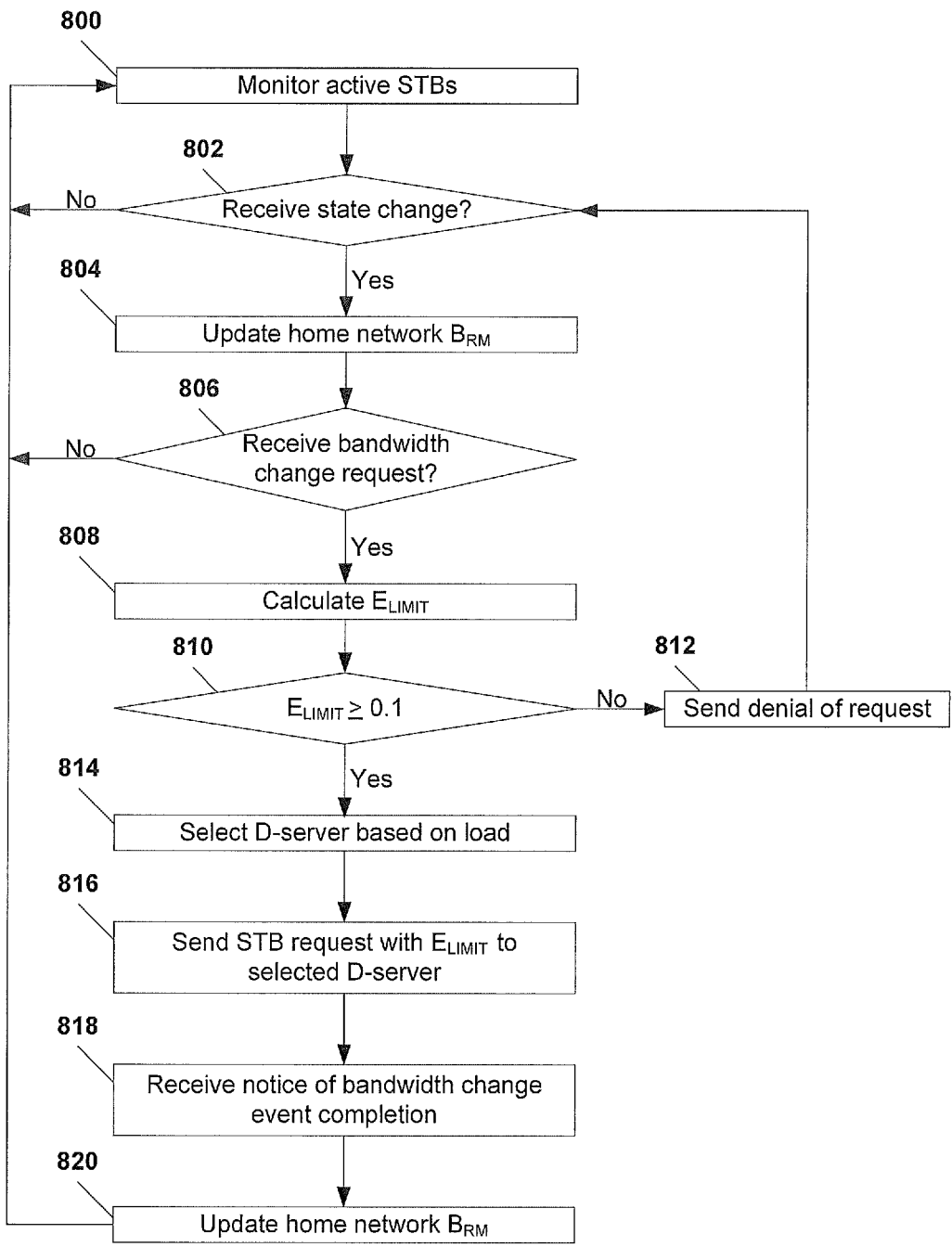
FIG. 8 is a flow diagram of a sixth particular embodiment of a method of delivering video content.

Referring to FIG. 8, a sixth particular embodiment of a method of delivering video content is illustrated. At block 800, an E-calculation server that is part of a cluster of D-servers monitors active set-top box devices. In an illustrative embodiment, the E-calculation server can monitor bandwidth usage of such set-top box devices via a subscriber management system. Moving to decision node 802, the E-calculation server can determine whether it has detected or been informed of a state change at an active set-top box device. If so, the method proceeds to block 804, and the E-calculation server updates a remaining bandwidth value ($B_{RM}$) associated with a home network of the set-top box device.

Continuing to decision node 806, the E-calculation server can determine whether it has received a bandwidth change request. The bandwidth change request can include, for example, a channel change request, a lost packet recovery request, or a start-up request. Such a request can be received directly from a set-top box device or from a D-server to which the request was sent by the set-top box device. If the E-calculation server receives a bandwidth change request, the method advances to block 808, and the E-calculation server calculate or estimates an overhead bandwidth factor ($E_{LIMIT}$) to be used in responding to the bandwidth change request.

At decision node 810, the E-calculation server can determine whether the calculated or estimated overhead bandwidth factor is less than a minimum threshold, such as 0.1. If so, the method moves to block 812, and the E-calculation server can send a denial to the set-top box device or D-server. The requesting set-top box device can retry its request after a delay period. Whereas, if the E-calculation server determines that the calculated or estimated overhead bandwidth factor is greater than or equal to the minimum threshold, the method moves to bock 814, and the E-calculation server can select a D-server to handle the bandwidth change request based on load across a plurality of D-servers. Proceeding to block 816, the E-calculation server sends the set-top box request with the $E_{LIMIT}$ value to the selected D-server.

In a particular embodiment, the E-calculation server can receive a notification from the selected D-server when the bandwidth change event is completed. The method can then advance to block 820, and the E-calculation server can update the remaining bandwidth for the home network to reflect the release of the overhead bandwidth used to response to the bandwidth change request.

Figure 9:
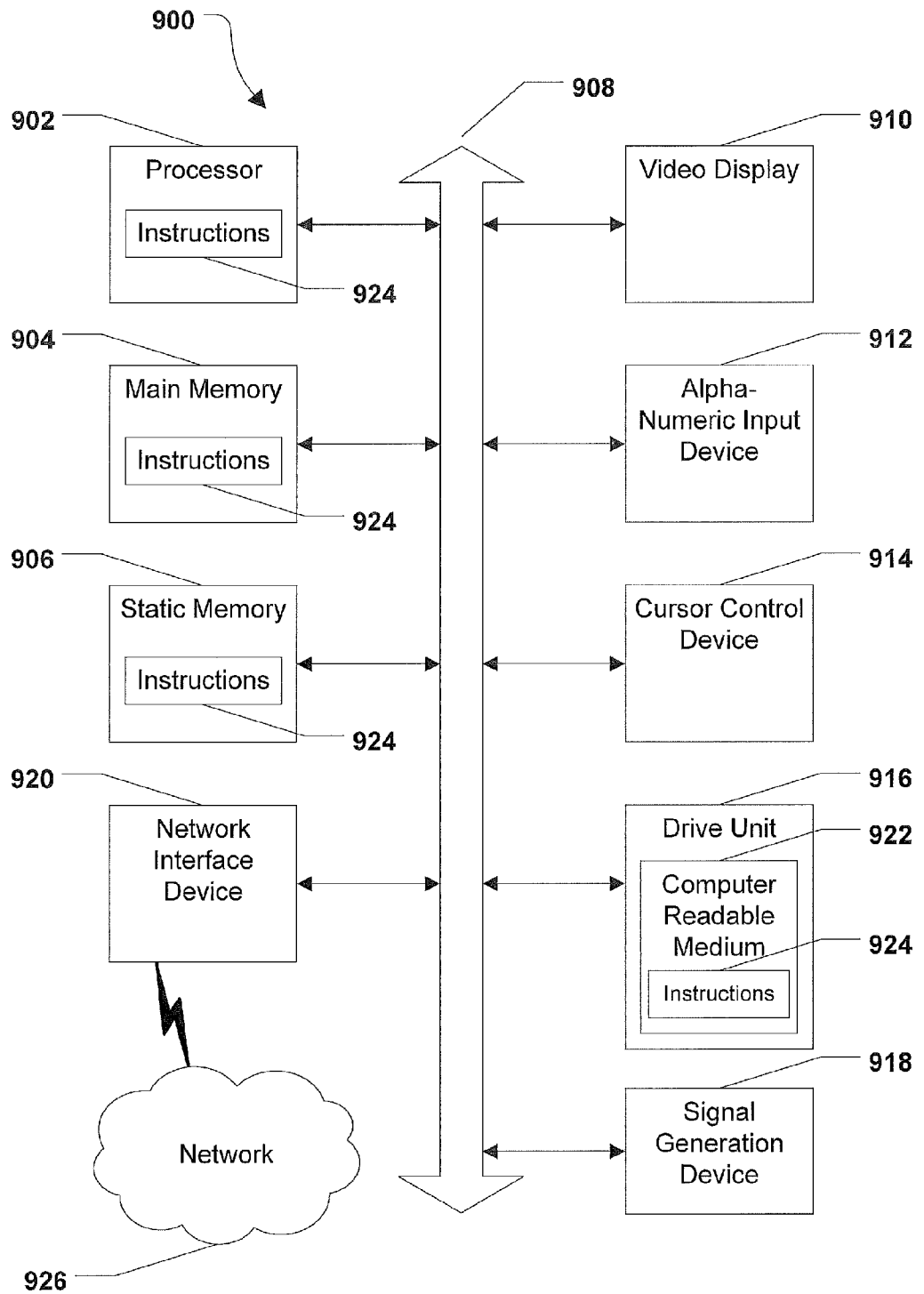
FIG. 9 is a diagram of an illustrative embodiment of a general computer system.

Referring to FIG. 9, an illustrative embodiment of a general computer system is shown and is designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. Moreover, the computer system 900 can include a main memory 904 and a static memory 906, which can communicate with each other via a bus 908. As shown, the computer system 900 may further include a video display unit 910, such as a liquid crystal display (LCD), an organic light emitting diode (OLED), a flat panel display, a solid state display, or a cathode ray tube (CRT). Additionally, the computer system 900 may include an input device 912, such as a keyboard, and a cursor control device 914, such as a mouse. The computer system 900 can also include a disk drive unit 916, a signal generation device 918, such as a speaker or remote control, and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the teen "computer-readable medium" includes a single medium or multiple media, such as a centralized or distributed database, and/or associated caches and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving, at a set-top box device, first video content associated with a requested channel from a first source;
   in response to receiving the first video content, requesting second video content associated with the requested channel from a second source;
   in response to receiving the second video content from the second source, determining whether a data packet associated with the requested channel was not received based on a comparison of first data packets corresponding to the first video content received from the first source and second data packets corresponding to the second video content received from the second source; and
   in response to a determination that the data packet was not received, sending a retry request to the first source, wherein the retry request includes an overhead bandwidth factor corresponding to a ratio between an overhead bandwidth used to send the data packet in response to the retry request and a nominal bandwidth used to send video content to the set-top box device.

2. The method of claim 1, further comprising:
   comparing a packet count to a threshold prior to sending the retry request to the first source;
   when the packet count is less than the threshold, assigning a first value to the overhead bandwidth factor; and
   when the packet count is at least equal to the threshold, assigning a second value to the overhead bandwidth factor, wherein the first value is greater than the second value.

3. The method of claim 2, wherein the second value is assigned at a pre-defined time after requesting the second video content from the second source.

4. The method of claim 1, wherein the first video content is received from the first source via unicast.

5. The method of claim 1, wherein the second video content is received from the second source via multicast.

6. The method of claim 1, further comprising calculating the overhead bandwidth factor prior to sending the retry request.

7. The method of claim 1, wherein the data packet is absent in the first video content received from the first source and in the second video content received from the second source.

8. The method of claim 1, wherein the set-top box device sends a stop request to the first source prior to sending the retry request, wherein the first source stops sending the first video content to the set-top box device in response to receiving the stop request, and wherein the first source sends the data packet to the set-top box device in response to receiving the retry request.

9. The method of claim 1, wherein the first video content is received at a first bandwidth, the second video content is received at a second bandwidth, and the overhead bandwidth factor is associated with a third bandwidth that is different from the first bandwidth and the second bandwidth, wherein the data packet is received at the third bandwidth.

10. The method of claim 1, wherein requesting the second video content includes sending a multicast join request to the second source.

11. The method of claim 1, wherein the overhead bandwidth factor is received from another set-top device.

12. The method of claim 1, wherein the overhead bandwidth factor is based on a number of set-top box devices connected to a home network.

13. A computer-readable storage device comprising processor-executable instructions that, when executed by a processor, cause the processor to:
receive, at a set-top box device, first video content associated with a requested channel from a first source;
in response to receiving the first video content, request second video content associated with the requested channel from a second source;
in response to receiving the second video content from the second source, determine whether a data packet associated with the requested channel was not received based on a comparison of first data packets corresponding to the first video content received from the first source and second data packets corresponding to the second video content received from the second source; and
in response to a determination that the data packet was not received, send a retry request to the first source, wherein the retry request includes an overhead bandwidth factor corresponding to a ratio between an overhead bandwidth used to send the data packet in response to the retry request and a nominal bandwidth used to send video content to the set-top box device.

14. The computer-readable storage device of claim 13, wherein the instructions are further executable by the processor to:
compare a packet count to a threshold prior to sending the retry request;
when the packet count is less than the threshold, assign a first value to the overhead bandwidth factor; and
when the packet count is at least equal to the threshold, assign a second value to the overhead bandwidth factor, wherein the first value is greater than the second value.

15. The computer-readable storage device of claim 14, wherein the second value is assigned at a pre-defined time after receiving the second video content from the second source.

16. The computer-readable storage device of claim 13, wherein the instructions are further executable by the processor to calculate the overhead bandwidth factor prior to sending the retry request.

17. The computer-readable storage device of claim 13, wherein the data packet is absent in the first video content received from the first source and the second video content received from the second source.

18. The computer-readable storage device of claim 13, wherein the instructions are further executable by the processor to send a stop request to the first source prior to sending the retry request, wherein the first source stops sending the first video content to the set-top box device in response to receiving the stop request, and wherein the first source sends the data packet to the set-top box device in response to receiving the retry request.

19. A method comprising:
sending a bandwidth change request from a set-top box device to a server, wherein the bandwidth change request identifies a requested channel associated with a multicast bandwidth and an overhead bandwidth factor that is based on a relationship between the multicast bandwidth and a unicast bandwidth that is greater than the multicast bandwidth;
receiving, responsive to the overhead bandwidth factor, video content associated with the requested channel at the unicast bandwidth;
buffering the video content in a queue at the set-top box device;
in response to buffering a threshold amount of the video content in the queue, sending a second request to join a multicast group to a second server, wherein the multicast group is associated with the requested channel; and
receiving the video content associated with the requested channel at the multicast bandwidth via the multicast group.

* * * * *